United States Patent
Yeo et al.

(10) Patent No.: US 10,105,638 B2
(45) Date of Patent: Oct. 23, 2018

(54) APPARATUS FOR SEPARATING CO2 FROM COMBUSTION GAS USING MULTI-STAGE MEMBRANES

(71) Applicant: KOREA INSTITUTE OF ENERGY RESEARCH, Daejeon (KR)

(72) Inventors: Jeong-Gu Yeo, Daejeon (KR); Jong-ho Moon, Seoul (KR); Jung-hyun Lee, Daegu (KR); Young Cheol Park, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 113 days.

(21) Appl. No.: 15/165,733

(22) Filed: May 26, 2016

(65) Prior Publication Data

US 2016/0346727 A1 Dec. 1, 2016

(30) Foreign Application Priority Data

May 29, 2015 (KR) .................. 10-2015-0076621
May 29, 2015 (KR) .................. 10-2015-0076622

(51) Int. Cl.
*B01D 53/22* (2006.01)

(52) U.S. Cl.
CPC ...... *B01D 53/226* (2013.01); *B01D 2053/221* (2013.01); *B01D 2257/504* (2013.01);
(Continued)

(58) Field of Classification Search
CPC ...... B01D 2258/0283; B01D 2257/504; B01D 53/226; B01D 2053/221; B01D 2317/027; Y02C 10/10
See application file for complete search history.

(56) References Cited

U.S. PATENT DOCUMENTS 4,130,403 A 12/1978 Cooley et al.
4,264,338 A 4/1981 Null
(Continued)

FOREIGN PATENT DOCUMENTS

JP 2009-242773 A 10/2009
KR 10-1086798 B1 11/2011
(Continued)

OTHER PUBLICATIONS

Li Zhao, et al., Abstract of "A parametric study of $CO_2/N_2$ gas separation membrane processes for post-combustion capture", Journal of Membrane Science, Nov. 15, 2008, pp. 1, vol. 325, No. 1.

*Primary Examiner* — Anthony R Shumate
(74) *Attorney, Agent, or Firm* — Sughrue Mion, PLLC

(57) ABSTRACT

An apparatus separating carbon dioxide from combustion gas using separation membranes, which includes: a first separation membrane in which combustion gas is injected into an inlet side of the first separation membrane; a second separation membrane in which residue gas of the first separation membrane is injected into an inlet side of the second separation membrane; and a third separation membrane in which permeate gas of the first separation membrane is injected into an inlet side of the third separation membrane, wherein at least a part of permeate gas of the third separation membrane is captured, and residue gas of the third separation membrane is injected into the inlet side of the first separation membrane or the second separation membrane. The present invention can be easily applied to an actual process by efficiently separating carbon dioxide using separation membranes.

8 Claims, 5 Drawing Sheets

(52) U.S. Cl.
CPC ............... *B01D 2258/0283* (2013.01); *B01D 2317/027* (2013.01); *Y02C 10/10* (2013.01)

(56) References Cited

U.S. PATENT DOCUMENTS

| | | | |
|---|---|---|---|
| 5,102,432 A | | 4/1992 | Prasad |
| 5,120,329 A | * | 6/1992 | Sauer .................... A23L 3/3418 426/419 |
| 5,332,547 A | * | 7/1994 | Olson .................... B01D 53/22 422/112 |
| 6,106,591 A | * | 8/2000 | Keskar .................. B01D 53/22 95/236 |
| 6,096,114 A | | 9/2000 | Li et al. |
| 6,168,649 B1 | | 1/2001 | Jensvold et al. |
| 6,565,626 B1 | | 5/2003 | Baker et al. |
| 7,964,020 B2 | | 6/2011 | Baker et al. |
| 8,591,627 B2 | | 11/2013 | Jain |
| 2004/0035553 A1 | * | 2/2004 | Bosher .................. A23L 3/3418 165/48.1 |
| 2011/0005272 A1 | | 1/2011 | Wijmans et al. |
| 2012/0267307 A1 | * | 10/2012 | McGinnis ............ B01D 61/002 210/638 |
| 2013/0058853 A1 | * | 3/2013 | Baker .................... B01D 53/22 423/228 |
| 2013/0098242 A1 | * | 4/2013 | Ungerank ............ B01D 53/226 95/51 |
| 2016/0115405 A1 | * | 4/2016 | Zubrin ...................... C10J 3/34 205/628 |
| 2016/0248111 A1 | * | 8/2016 | Gasda ................ H01M 8/0668 |
| 2016/0288047 A1 | * | 10/2016 | Fukuda ................ B01D 63/02 |

FOREIGN PATENT DOCUMENTS

| | | |
|---|---|---|
| KR | 10-1327337 B1 | 11/2013 |
| KR | 10-1414491 B1 | 7/2014 |

* cited by examiner

APPARATUS FOR SEPARATING CO2 FROM COMBUSTION GAS USING MULTI-STAGE MEMBRANES

CROSS-REFERENCE TO RELATED APPLICATION

This application claims the benefit of Korean Patent Application No. 10-2015-0076621, filed on May 29, 2015 and Korean Patent Application No. 10-2015-0076622, filed on May 29, 2015 in the Korean Intellectual Property Office, the disclosures of which are incorporated herein by reference.

BACKGROUND OF THE INVENTION

1. Field of the Invention

The present invention relates generally to an apparatus for separating carbon dioxide from combustion gas and, more particularly, to an apparatus for efficiently separating carbon dioxide from combustion gas using multiple separation membranes and for allowing easy application to an actual process.

2. Description of the Related Art

Generally, technologies for capturing carbon dioxide that contributes to greenhouse effects have been developed recent years. The technologies for capturing carbon dioxide can be classified into post-combustion capture, pre-combustion capture, and oxyfuel combustion capture. Post-combustion capture can be classified into chemical absorption using an aqueous amine or ammonia absorbent, dry-type absorption using a solid absorbent instead of an existing aqueous absorbent, and a membrane separation using a separation membrane, etc. The membrane separation method has an advantage of being an environmentally friendly process. However, only membrane materials and modules have been mainly developed, and studies on post-combustion capture have been conducted by only a minority of companies.

U.S. Pat. No. 7,964,020 discloses gas separation processes using membranes with permeate sweep to remove carbon dioxide from combustion gases.

U.S. Pat. No. 7,964,020 includes processes of injecting a flue gas stream to be treated into a feed side of a membrane, injecting sweep gas, usually air, to a permeate side of the membrane, and passing a permeate stream and the sweep gas to a combustor. In this way, the permeate stream of the membrane is withdrawn to a boiler with the sweep gas, thereby building up carbon dioxide concentration on the feed side of the membrane. However, the above processes disclosed in U.S. Pat. No. 7,964,020 have a limited application to an actual process for a power plant since the processes cause a change in efficiency of the boiler.

U.S. Pat. No. 4,264,338 discloses a method for separating gases by a process using multiple stages of membrane separation, whereby an unpermeated residue of a second stage membrane or a third stage membrane is recovered, and a permeant mixture is passed to an inlet of a first stage membrane and therefore a separation factor of the first stage membrane is increased. However, the gas separation method recovering and using an unpermeated residue has a limitation in increasing carbon dioxide separation performance of a gas separation system.

DOCUMENTS OF RELATED ART (Patent Document 1) U.S. Pat. No. 7,964,020 (Gas separation process using membranes with permeate sweep to remove CO2 from combustion gases)

(Patent Document 2) U.S. Pat. No. 4,264,338 (Method for separating gases)

(Patent Document 3) U.S. Pat. No. 5,102,432 (Three-stage membrane gas separation process and system)

(Thesis Document 1) A parametric study of CO2/N2 gas separation membrane processes for post-combustion capture (L Zhao, E Riensche, R Menzer, L Blum; Journal of Membrane, 2008, Elsevier)

SUMMARY OF THE INVENTION

Accordingly, the present invention has been made keeping in mind the above problems occurring in the related art, and, in one aspect, the present invention is intended to propose an apparatus for efficiently separating carbon dioxide from combustion gas using multiple separation membranes.

In another aspect, the present invention is intended to propose an apparatus for separating carbon dioxide from combustion gas, which can be easily applied to an actual process.

In order to achieve the above objects, according to the present invention, an apparatus for separating carbon dioxide from combustion gas using multiple separation membranes includes: a first separation membrane in which combustion gas is injected into an inlet side of the first separation membrane; a second separation membrane in which residue gas of the first separation membrane is injected into an inlet side of the second separation membrane; and a third separation membrane in which permeate gas of the first separation membrane is injected into an inlet side of the third separation membrane, wherein at least a part of permeate gas of the third separation membrane is captured, and residue gas of the third separation membrane is injected into the inlet side of the first separation membrane or the second separation membrane.

In the separation apparatus, at least another part of the permeate gas of the third separation membrane may be injected into the inlet side of the third separation membrane, and the residue gas of the third separation membrane may be injected into the inlet side of the first separation membrane. At this time, permeate gas of the second separation membrane may be injected into the inlet side of the first separation membrane. Further, selectively at least another part of the permeate gas of the third separation membrane may be injected into the inlet side of the third separation membrane, and the residue gas of the third separation membrane may be injected into the inlet side of the second separation membrane.

Further, in the separation apparatus, at least a part of permeate gas of the second separation membrane may be injected into the inlet side of the second separation membrane, and at least another part of the permeate gas of the second separation membrane may be injected into the inlet side of the first separation membrane.

Furthermore, a sensor that senses carbon dioxide concentration of the permeate gas of the second separation membrane or the residue gas of the third separation membrane, which is injected into the inlet side of the first separation membrane, may be provided. A pressure unit may be provided on at least one inlet side of the first to the third separation membranes, and a decompression unit may be provided on at least one permeate side of the first to the third separation membranes.

Meanwhile, the separation apparatus further includes a fourth separation membrane, in which permeate gas of the second separation membrane may be injected into an inlet side of the fourth separation membrane, residue gas of the fourth separation membrane may be injected into the inlet side of the second separation membrane, and permeate gas of the fourth separation membrane may be injected into the inlet side of the first separation membrane.

In addition, the apparatus for separating carbon dioxide from combustion gas using multiple separation membranes of the present invention is provided with: a separation membrane; a first line in which the combustion gas is injected into an inlet side of the separation membrane; a second line in which a residue gas of the separation membrane is discharged; and a third line in which a permeate gas of the separation membrane is injected into the inlet side of the separation membrane.

According to the present invention as described above, the present invention can efficiently separate carbon dioxide from combustion gas using multiple separation membranes. Further, the present invention can provide an apparatus for separating carbon dioxide from combustion gas, which can be easily applied to an actual process.

DESCRIPTION OF REFERENCE NUMERALS 104, 106, 107, 113, 206, 402, 405, 414, 424, 510: separation membrane
102, 111, 122, 204, 410, 420: compressor
109, 116, 120, 202, 208, 512: vacuum pump

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE EMBODIMENTS

Hereinbelow, exemplary embodiments of the present invention will be described with reference to the accompanying drawings. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

In the present invention, self-recycle means that permeate gas of a specific separation membrane is injected into an inlet side of itself. Further, inlet gas means gas that is injected into the inlet side of the specific separation membrane, permeate gas means gas that is discharged by passing through the specific separation membrane, and residue gas means gas that is discharged without passing through a permeate side of a separation membrane.

Figure 1:
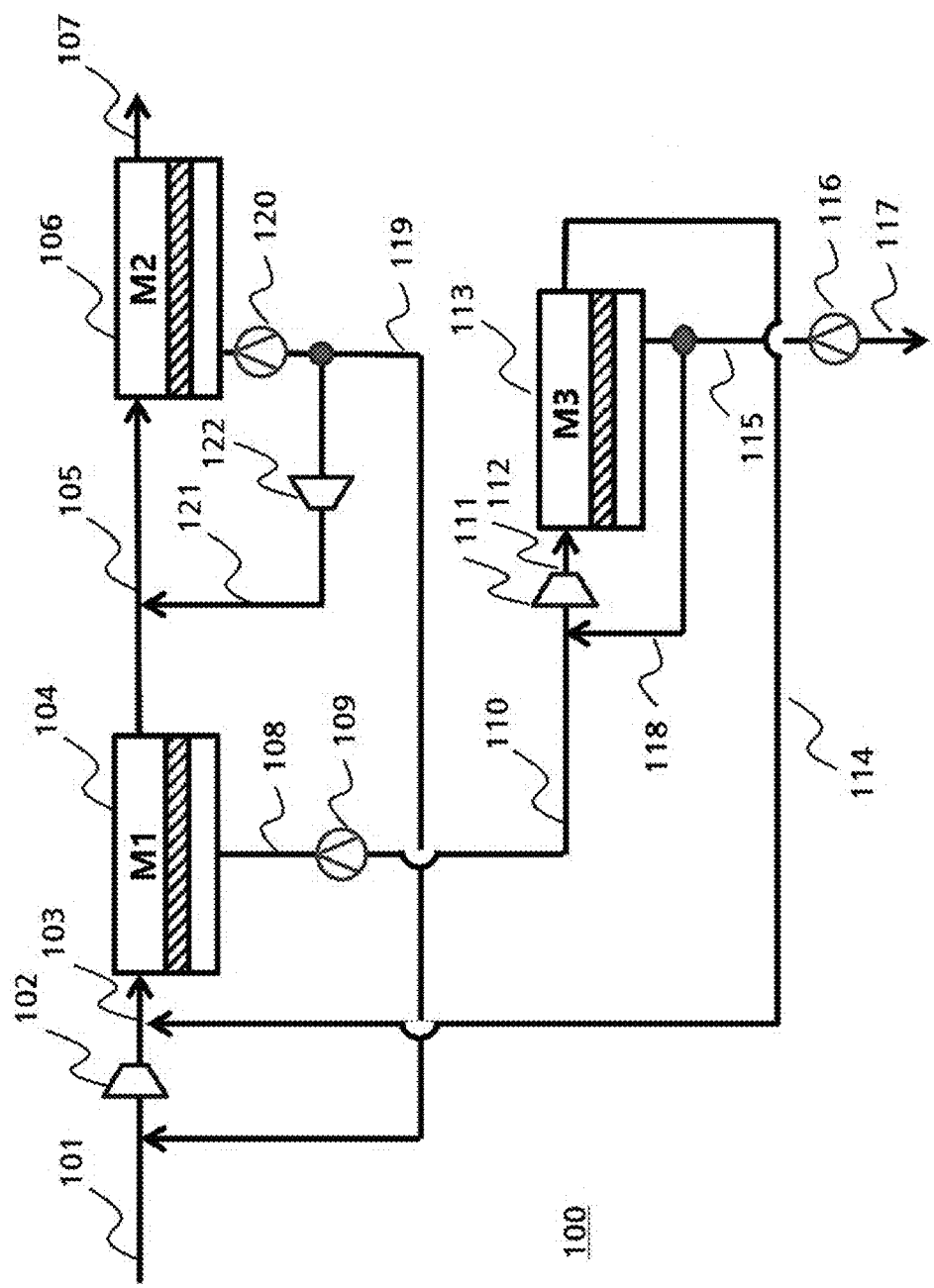
FIG. 1 is a block diagram showing a carbon dioxide separation system according to a first embodiment of the present invention.

FIG. 1 is a block diagram showing a carbon dioxide separation system 100 according to a first embodiment of the present invention. As shown in FIG. 1, the carbon dioxide separation system 100 includes three separation membranes 104, 106, and 113. Compressors 102, 112, and 122 may be provided on inlet sides of the separation membranes 104, 106, and 113, and vacuum pumps 109, 116, and 120 may be selectively provided on permeate sides of the separation membranes 104, 106, and 113. The compressor may be substituted with a pressure unit, such as a blower, and the vacuum pump may be substituted with a decompression unit, such as a fan. The pressure unit or the decompression unit may be omitted in accordance with pressure conditions.

FIG. 1 illustrates the configuration of the separation membrane 104 in which combustion gas is injected into an inlet side of the separation membrane 104, the separation membrane 106 in which residue gas of the separation membrane 104 is injected into an inlet side of the separation membrane 106, and the separation membrane 113 in which permeate gas of the separation membrane 104 is injected into an inlet side of the separation membrane 113, wherein at least a part of permeate gas of the separation membrane 113 is captured, and residue gas of the separation membrane 113 is injected into the inlet side of the separation membrane 104.

Specifically, combustion gas discharged from a boiler, etc., is injected into the compressor 102 via line 101, the compressor 102 compresses the combustion gas and injects the combustion gas into the inlet side of the separation membrane 104 via line 103. Carbon dioxide of the combustion gas that is injected into the inlet side of the separation membrane 104 flows into a permeate side of the separation membrane 104. The vacuum pump 109 applies a vacuum to the permeate side of the separation membrane 104 via line 108 to smoothly flow the combustion gas that is injected into the inlet side of the separation membrane 104 into the permeate side of the separation membrane 104. Residue gas that does not pass through the separation membrane 104 is injected into the inlet side of the separation membrane 106 via line 105 from a residue of the separation membrane 104.

Residue gas of the separation membrane 106 is discharged via line 107. The residue gas has carbon dioxide removal rate of approximately equal to or greater than about 80% and has carbon dioxide concentration of approximately equal to or less than about 3%. Permeate gas of the separation membrane 106 is suctioned by the vacuum pump 120 and supplied to the compressor 102 via line 119 and line 101. Further, a part of permeate gas of the separation membrane 106 is compressed by the compressor 122 and may be injected into the inlet side of the separation membrane 106 via line 121 and line 105. The permeate gas of the separation membrane 106 is injected into the inlet side of the separation membrane 106 via line 121 and line 105 and therefore the separation membrane 106 has a self-recycle loop. The self-recycle loop increases carbon dioxide concentration of the inlet side of the separation membrane 106 and therefore separation performance of the separation membrane 106 is improved.

The permeate gas of the separation membrane 104 is suctioned by the vacuum pump 109 and supplied to the compressor 111 via line 110, and compressed by the compressor 111 and injected into the inlet side of the separation membrane 113 via line 112. The residue gas of the separation membrane 113 is injected into the inlet side of the separation membrane 104. The permeate gas of the separation membrane 113 is suctioned by the vacuum pump 116 via line 115 and supplied to a carbon dioxide capture apparatus (not shown in the drawing). Further, a part of the permeate gas of the separation membrane 113 is supplied to the compressor 111 via line 118 and may be injected into the inlet side of the separation membrane 113. The permeate gas of the separation membrane 113 is injected into the inlet side of the separation membrane 113 and therefore carbon dioxide selectivity of the separation membrane 113 is also improved by the self-recycle loop.

The permeate gas of the separation membrane 106 is injected into the inlet side of the separation membrane 106 by dividing the permeate gas of the separation membrane 106, and therefore carbon dioxide selectivity of the separation membrane 106 is improved by increasing carbon dioxide concentration of inlet gas of the separation membrane 106. Further, the permeate gas of the separation membrane 106 having high carbon dioxide concentration is injected into the inlet side of the separation membrane 104. Moreover, the residue gas of the separation membrane 113 having the self-recycle loop is injected into the inlet side of the separation membrane 104. As a result, carbon dioxide selectivity of the separation membrane 104 is improved by increasing carbon dioxide concentration of inlet gas of the separation membrane 104. By this action, carbon dioxide purity of permeate gas of the separation membrane 113 is improved equal to or greater than 80%.

Composition of the combustion gas supplied to the compressor 102 via line 101 are determined by performance of a combustion apparatus, and typically carbon dioxide concentration of the combustion gas is approximately 10% to 30%. In the permeate gas of the separation membrane 106 supplied to the compressor 102 via line 119 and the residue gas of the separation membrane 113 injected to the inlet side of the separation membrane 104 via line 114, when carbon dioxide concentration is equal to or greater than initial injection concentration via line 101, carbon dioxide separation performance of the overall system 100 can be improved. Thus, a carbon dioxide concentration sensor may be provided on line 119 and/or line 114 to sense carbon dioxide concentration of permeate gas of the separation membrane 106 and residue gas of the separation membrane 113. When carbon dioxide concentration is equal to or less than initial injection concentration, operation of the compressors 102, 112, and 122, or the vacuum pumps 109, 116, and 120 can be controlled. The compressor may be substituted with the pressure unit, such as the blower, and the vacuum pump may be substituted with the decompression unit, such as the fan. The pressure unit or the decompression unit may be omitted in accordance with pressure conditions.

Figure 2:
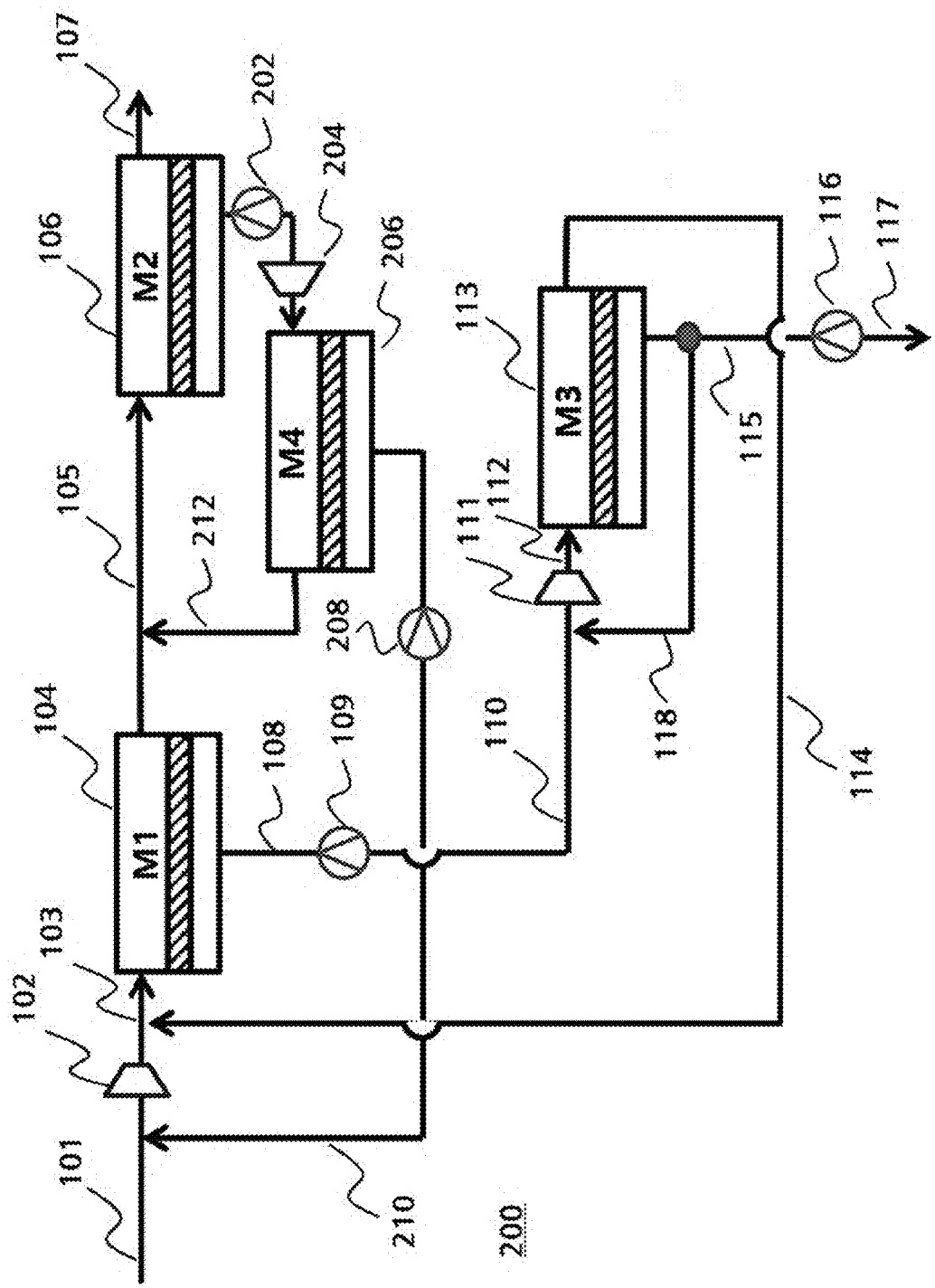
FIG. 2 is a block diagram showing a carbon dioxide separation system according to a second embodiment of the present invention.

FIG. 2 is a block diagram showing a carbon dioxide separation system 200 according to a second embodiment of the present invention. As shown in FIG. 2, the carbon dioxide separation system 200 includes four separation membranes 104, 106, 113, and 206. Compressors 102, 111, and 204 may be provided on inlet sides of the separation membranes 104, 106, 113, and 206, and vacuum pumps 109, 116, 202, and 208 may be selectively provided on permeate sides of the separation membranes 104, 106, 113, and 206.

Combustion gas is injected into the compressor 102 via line 101, the compressor 102 compresses the combustion gas and injects the combustion gas into an inlet side of the separation membrane 104 via line 103. Carbon dioxide of the combustion gas injected into the inlet side of the separation membrane 104 flows into a permeate side of the separation membrane 104. The vacuum pump 109 applies vacuum to the permeate side of the separation membrane 104 via line 108 to smoothly flow the combustion gas injected into the inlet side of the separation membrane 104 into the permeate side of the separation membrane 104. Residue gas that does not pass through the separation membrane 104 is injected from a residue side of the separation membrane 104 into an inlet side of the separation membrane 106 via line 105.

Residue gas of the separation membrane 106 is discharged via line 107. The gas discharged via line 107 has a carbon dioxide removal rate of approximately equal to or greater than about 80% and has carbon dioxide concentration of approximately equal to or less than about 3%. Permeate gas of the separation membrane 106 is suctioned by the vacuum pump 202, and compressed by the compressor 204 and injected into an inlet side of a separation membrane 206. Residue gas of the separation membrane 206 is injected into the inlet side of the separation membrane 106 via line 212 and line 105.

When comparing the system 100 with the system 200, in the separation system 100, the permeate gas of the separation membrane 106 is injected into the inlet side of the separation membrane 106 via line 121 and line 105. However, in the separation system 200, the permeate gas of the separation membrane 106 passes through the additional separation membrane 206, and the residue gas of the separation membrane 206 is injected into the inlet side of the separation membrane 106.

The permeate gas of the separation membrane 106 is injected into the inlet side of the separation membrane 106 via the separation membrane 206 and therefore the separation membrane 106 has a self-recycle loop. The self-recycle loop increases carbon dioxide concentration of the inlet side of the separation membrane 106 and improves separation performance of the separation membrane 106. Permeate gas of the separation membrane 206 having high carbon dioxide concentration is suctioned by the vacuum pump 208 and injected into the inlet side of the separation membrane 104 via line 210.

Permeate gas of the separation membrane 104 is suctioned by the vacuum pump 109 and supplied to the compressor 111 via line 110, and compressed by the compressor 111 and injected into an inlet side of a separation membrane 113 via line 112. Permeate gas of the separation membrane 113 is suctioned by the vacuum pump 116 via line 115 and supplied to a carbon dioxide capture apparatus (not shown in the drawing). A part of permeate gas of the separation membrane 113 is supplied to the compressor 111 via line 118 and injected into the inlet side of the separation membrane 113. The permeate gas of the separation membrane 113 is injected into the inlet side of the separation membrane 113 via line 118 and therefore carbon dioxide selectivity of the separation membrane 113 is also improved by the self-recycle loop. Residue gas of the separation membrane 113 is injected into the inlet side of the separation membrane 104.

The permeate gas of the separation membrane 106 is injected into the inlet side of the separation membrane 106 via the separation membrane 206 and therefore carbon dioxide selectivity of the separation membrane 106 is improved by increasing carbon dioxide concentration of inlet gas of the separation membrane 106. Further, permeate gas of the separation membrane 206 having high carbon dioxide concentration is injected into the inlet side of the separation membrane 104. Moreover, the residue gas of the separation membrane 113 having the self-recycle loop is injected into the inlet side of the separation membrane 104. As a result, carbon dioxide selectivity of the separation membrane 104 is improved by increasing carbon dioxide concentration of inlet gas of the separation membrane 104. By this action, carbon dioxide purity of the permeate gas of the separation membrane 113 is improved equal to or greater than 80%.

Figure 3:
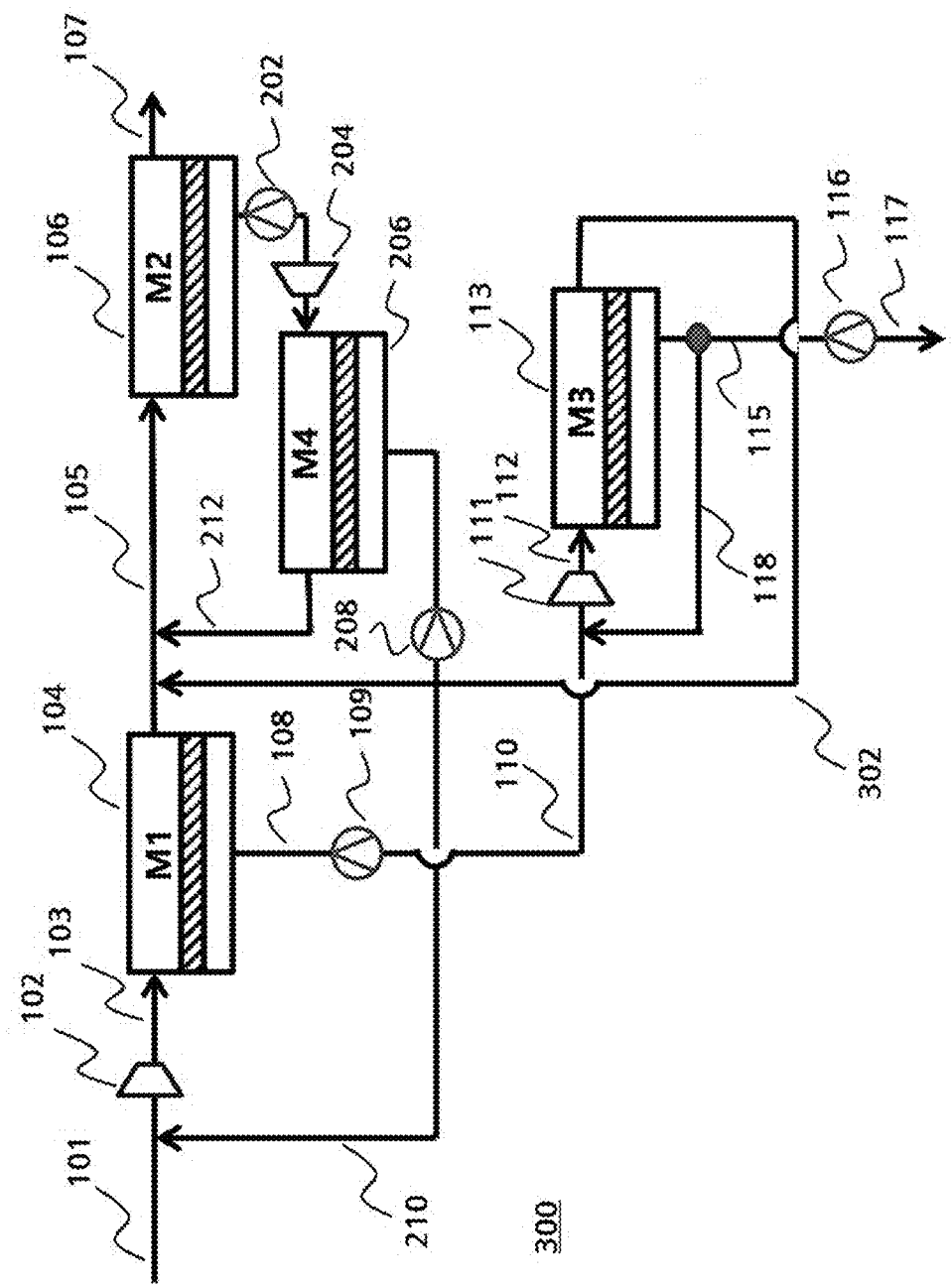
FIG. 3 is a block diagram showing a carbon dioxide separation system according to a third embodiment of the present invention.

FIG. 3 is a block diagram showing a carbon dioxide separation system 300 according to a third embodiment of the present invention. FIG. 3 illustrates the configuration of a separation membrane 104 in which combustion gas is injected into an inlet side of the separation membrane 104, a separation membrane 106 in which residue gas of the separation membrane 104 is injected into an inlet side of the separation membrane 106, and a separation membrane 113 in which permeate gas of the separation membrane 104 is injected into an inlet side of the separation membrane 113, wherein at least a part of permeate gas of the separation membrane 113 is captured, and residue gas of the separation membrane 113 is injected into the inlet side of the separation membrane 106. In other words, the system 300 compared to the system 100 and 200 is different in that the residue gas of the separation membrane 113 is injected into the inlet side of the separation membrane 106 rather than the separation membrane 104.

In addition, in the carbon dioxide separation system 300, carbon dioxide selectivity of the separation membrane 104 is improved since permeate gas of the separation membrane 206 is injected into the inlet side of the separation membrane 104. Carbon dioxide selectivity of the separation membrane 106 is improved since permeate gas of the separation membrane 106 is injected into the inlet side of itself via the additional separation membrane 206, and the residue gas of the separation membrane 113 is injected into the inlet side of the separation membrane 106. Carbon dioxide selectivity of the separation membrane 113 is improved since the part of the permeate gas of the separation membrane 113 is injected into the inlet side of the separation membrane 113.

Figure 4:
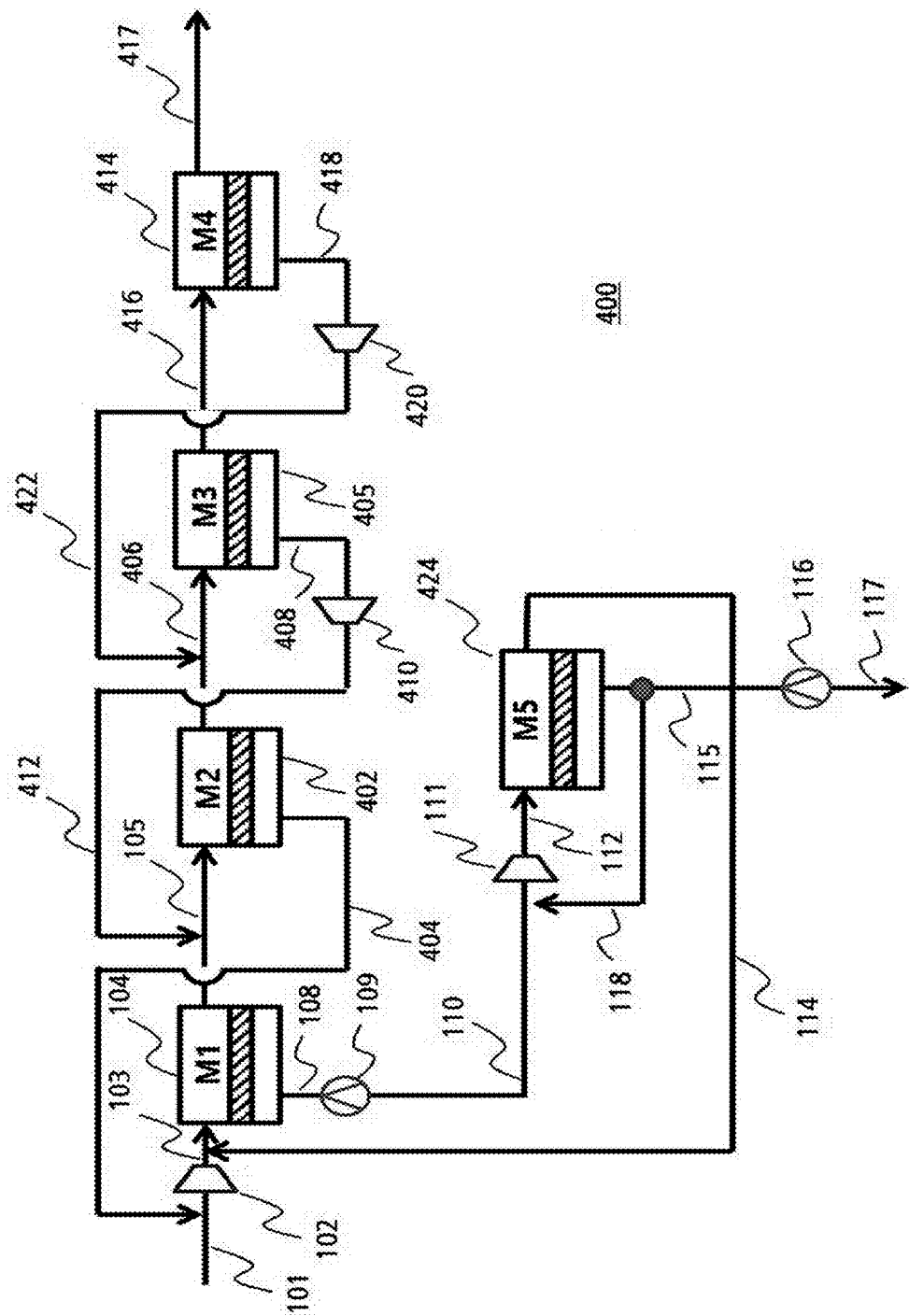
FIG. 4 is a block diagram showing a carbon dioxide separation system according to a fourth embodiment of the present invention.

FIG. 4 is a block diagram showing a carbon dioxide separation system 400 according to a fourth embodiment of the present invention. As shown in FIG. 4, the carbon dioxide separation system 400 includes five separation membranes 104, 402, 405, 414, and 424. Compressors 102, 111, 410, and 420 may be provided on inlet sides of the separation membranes 104, 402, 405, 414, and 424, and vacuum pumps 109 and 116 may be selectively provided on permeate sides of the separation membranes 104, 402, 405, 414, and 424.

Combustion gas is injected into the compressor 102 via line 101, the compressor 102 compresses the combustion gas and injects the combustion gas into an inlet side of the separation membrane 104 via line 103. Carbon dioxide of the combustion gas that is injected into the inlet side of the separation membrane 104 flows into a permeate side of the separation membrane 104. The vacuum pump 109 applies vacuum to the permeate side of the separation membrane 104 via line 108 to smoothly flow the combustion gas that is injected into the inlet side of the separation membrane 104 into the permeate side of the separation membrane 104. Residue gas that does not pass through the separation membrane 104 is injected from a residue side of the separation membrane 104 into an inlet side of the separation membrane 402 via line 105.

Permeate gas of the separation membrane 402 is supplied to the compressor 102 via line 404. Residue gas of separation membrane 402 is injected into an inlet side of the separation membrane 405 via line 406. Permeate gas of the separation membrane 405 is supplied to the compressor 410 via line 408, and the permeate gas compressed by the compressor 410 is injected into the inlet side of the separation membrane 402 via line 412. Residue gas of the separation membrane 405 is injected into an inlet side of the separation membrane 414 via line 416, the permeate gas of the separation membrane 405 is supplied to the compressor 420 via line 418, and the permeate gas supplied to the compressor 420 is injected into the inlet side of the separation membrane 405 via line 422. In other words, in the separation membranes 104, 402, 405, and 414 connected in series, permeate gases of the separation membrane 402, 405, and 414 are injected into the inlet sides of separation membranes 104, 402, and 405 of previous stages. The separation membrane 414 has carbon dioxide removal rate of approximately equal to or greater than about 80% and discharges residue gas having carbon dioxide concentration of approximately equal to or less than about 3% via line 417.

Permeate gas of the separation membrane 104 is suctioned by the vacuum pump 109 and supplied to the compressor 111 via line 110, and compressed by the compressor 111 and injected into an inlet side of a separation membrane 424 via line 112. Permeate gas of the separation membrane 424 is suctioned by the vacuum pump 116 via line 115 and supplied to a carbon dioxide capture apparatus (not shown in the drawing). A part of the permeate gas of the separation membrane 424 is supplied to the compressor 111 via line 118 and injected into the inlet side of the separation membrane 424. The permeate gas of the separation membrane 424 is injected into the inlet side of the separation membrane 424 and therefore carbon dioxide selectivity of the separation membrane 424 is improved by the self-recycle loop. Residue gas of the separation membrane 424 is injected into the inlet side of the separation membrane 104.

The permeate gas of the separation membrane 402 and the residue gas of the separation membrane 424 are injected into the inlet side of the separation membrane 104 and therefore carbon dioxide selectivity of the separation membrane 104 is improved by increasing carbon dioxide concentration of inlet gas of the separation membrane 104. Carbon dioxide selectivity of the separation membrane 402 is improved since the permeate gas of the separation membrane 405 is injected into the inlet side of the separation membrane 402. Carbon dioxide selectivity of the separation membrane 405 is improved since the permeate gas of the separation membrane 414 is injected into the inlet side of the separation membrane 405. Carbon dioxide selectivity of the separation membrane 424 is improved by the self-recycle loop in which permeate gas is injected into an inlet side. As a result, carbon dioxide purity of the permeate gas of the separation membrane 424 is improved equal to or greater than 80%.

Figure 5:
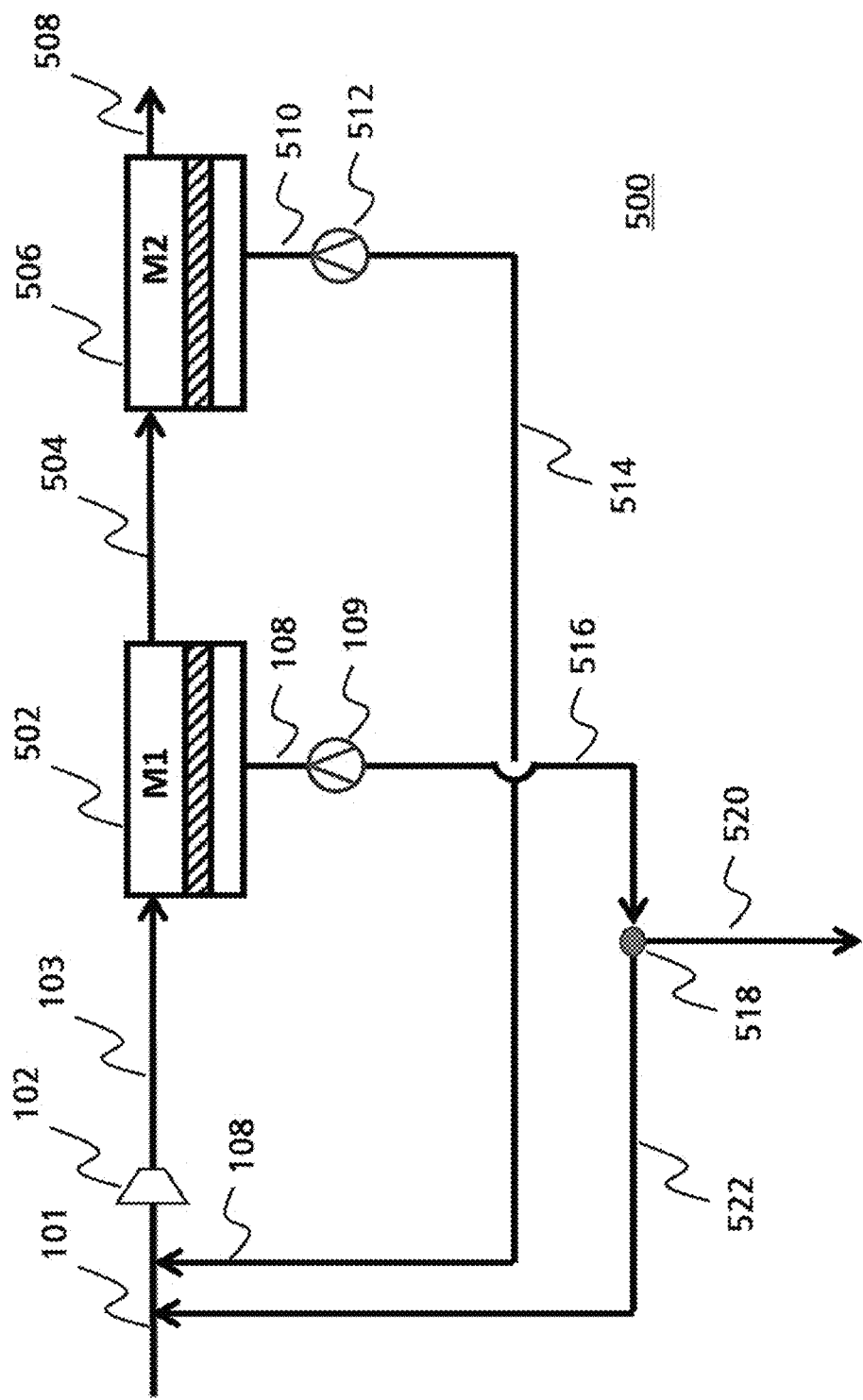
FIG. 5 is a block diagram showing a carbon dioxide separation system according to a fifth embodiment of the present invention.

FIG. 5 is a block diagram showing a carbon dioxide separation system 500 according to a fifth embodiment of the present invention. As shown in FIG. 5, the carbon dioxide separation system 500 includes two separation membranes 502 and 506. A compressor 102 may be provided on an inlet side of a separation membrane 502, and vacuum pumps 109 and 512 may be selectively provided on permeate sides of the separation membranes 502 and 506.

Combustion gas is injected into the compressor 102 via line 101 and the compressor 102 compresses the combustion gas and injects the combustion gas into the inlet side of the separation membrane 502 via line 103. Carbon dioxide of the combustion gas that is injected into the inlet side of the separation membrane 502 flows into a permeate side of the separation membrane 502. The vacuum pump 109 applies a vacuum to the permeate side of the separation membrane 502 via line 108 to smoothly flow the combustion gas that is injected into the inlet side of the separation membrane 502 into the permeate side of the separation membrane 502. A part of the permeate gas of the separation membrane 502 is injected into the inlet side of the separation membrane 502 by dividing the permeate gas at a branch point 518, and another part is supplied to a carbon dioxide capture apparatus (not shown in the drawing). Residue gas that does not pass through the separation membrane 502 is injected from a residue side of the separation membrane 502 into an inlet side of the separation membrane 506 via line 504.

Permeate gas of the separation membrane 506 is suctioned by the vacuum pump 512 and supplied to the compressor 102. The separation membrane 506 has carbon dioxide removal rate of approximately equal to or greater than about 80% and discharges residue gas having carbon dioxide concentration of approximately equal to or less than about 3% via line 508.

Carbon dioxide selectivity of the separation membrane 502 is improved since permeate gases of the separation membranes 502 and 506 are injected into the inlet side of the separation membrane 502. As a result, carbon dioxide purity of the permeate gas of the separation membrane 502 is improved by equal to or greater than 80%.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A carbon dioxide separation apparatus for separating carbon dioxide from combustion gas using multiple separation membranes, the carbon dioxide separation apparatus comprising:
   a first separation membrane in which combustion gas is injected into an inlet side of the first separation membrane;
   a second separation membrane in which residue gas of the first separation membrane is injected into an inlet side of the second separation membrane; and
   a third separation membrane in which permeate gas of the first separation membrane is injected into an inlet side of the third separation membrane,
   wherein at least a part of permeate gas of the third separation membrane is supplied to a carbon dioxide capture apparatus and captured by the carbon dioxide capture apparatus, and at least another part of the permeate gas of the third separation membrane is injected into the inlet side of the third separation membrane directly without passing through the carbon dioxide capture apparatus, and residue gas of the third separation membrane is injected into the inlet side of the first separation membrane or the second separation membrane.

2. The carbon dioxide separation apparatus of claim 1, wherein at least a part of permeate gas of the second separation membrane is injected into the inlet side of the second separation membrane.

3. The carbon dioxide separation apparatus of claim 2, wherein at least another part of the permeate gas of the second separation membrane is injected into the inlet side of the first separation membrane.

4. The carbon dioxide separation apparatus of claim 1, wherein at least a part of permeate gas of the second separation membrane is injected into the inlet side of the first separation membrane.

5. A carbon dioxide separation apparatus for separating carbon dioxide from combustion gas using multiple separation membranes, the carbon dioxide separation apparatus comprising:
   a first separation membrane in which combustion gas is injected into an inlet side of the first separation membrane;
   a second separation membrane in which residue gas of the first separation membrane is injected into an inlet side of the second separation membrane; and
   a third separation membrane in which permeate gas of the first separation membrane is injected into an inlet side of the third separation membrane,
   wherein at least a part of permeate gas of the third separation membrane is captured, and residue gas of the third separation membrane is injected into the inlet side of the first separation membrane or the second separation membrane,
   wherein at least a part of permeate gas of the second separation membrane is injected into the inlet side of the first separation membrane, and
   wherein the carbon dioxide separation apparatus further comprises:
   a sensor that senses carbon dioxide concentration of the permeate gas of the second separation membrane or the residue gas of the third separation membrane, which is injected into the inlet side of the first separation membrane.

6. The carbon dioxide separation apparatus of claim 1, wherein a pressure unit is provided on at least one inlet side of the first to third separation membranes.

7. The carbon dioxide separation apparatus of claim 1, wherein a decompression unit is provided on at least one permeate side of the first to third separation membranes.

8. The carbon dioxide separation apparatus of claim 1, further comprising:
   a fourth separation membrane in which permeate gas of the second separation membrane is injected into an inlet side of the fourth separation membrane,
   wherein residue gas of the fourth separation membrane is injected into the inlet side of the second separation membrane, and permeate gas of the fourth separation membrane is injected into the inlet side of the first separation membrane.

* * * * *